United States Patent
Chang

(10) Patent No.: US 12,498,413 B2
(45) Date of Patent: Dec. 16, 2025

(54) SPEED DETECTION CIRCUIT AND ASSOCIATED CHIP

(71) Applicant: Realtek Semiconductor Corp., HsinChu (TW)

(72) Inventor: Chih-Chiang Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 344 days.

(21) Appl. No.: 18/198,301

(22) Filed: May 17, 2023

(65) Prior Publication Data
US 2023/0384362 A1 Nov. 30, 2023

(30) Foreign Application Priority Data

May 26, 2022 (TW) .................................. 111119664

(51) Int. Cl.
*G01R 31/28* (2006.01)
*G01R 31/317* (2006.01)
*H03K 3/037* (2006.01)
*H03K 5/135* (2006.01)

(52) U.S. Cl.
CPC ... *G01R 31/2837* (2013.01); *G01R 31/31725* (2013.01); *H03K 3/037* (2013.01); *H03K 5/135* (2013.01)

(58) Field of Classification Search
CPC .......... G01R 31/2837; G01R 31/31725; H03K 3/037; H03K 5/135
See application file for complete search history.

(56) References Cited

U.S. PATENT DOCUMENTS

| | | | | |
|---|---|---|---|---|
| 5,796,751 | A * | 8/1998 | Kundu | G01R 31/31858 714/E11.019 |
| 6,125,461 | A * | 9/2000 | Huisman | G01R 31/3016 714/724 |
| 12,169,222 | B2 * | 12/2024 | Yang | H03K 3/037 |

(Continued)

FOREIGN PATENT DOCUMENTS

TW    I323562    4/2010

OTHER PUBLICATIONS

H. Yan and A. D. Singh, "A New Delay Test Based on Delay Defect Detection Within Slack Intervals (DDSI)," in IEEE Transactions on Very Large Scale Integration (VLSI) Systems, vol. 14, No. 11, pp. 1216-1226, Nov. 2006 (Year: 2006).*

*Primary Examiner* — Cynthia Britt
(74) *Attorney, Agent, or Firm* — Winston Hsu

(57) ABSTRACT

The present invention provides a speed detection circuit positioned in a chip, wherein the speed detection circuit includes a test signal generator, a launch flip-flop, a device under test (DUT), a capture flip-flop, a comparator and a control circuit. The test signal generator is configured to generate a test signal with a specific pattern. The launch flip-flop is configured to use a first clock signal to sample the test signal to generate a sampled test signal. The device under test is configured to receive the sampled test signal to generate a delayed test signal. The capture flip-flop is configured to use a second clock signal to sample the delayed test signal to generate an output signal. The comparator is configured to determine whether the output signal conforms to the specific pattern to generate a comparison result, for the control circuit to determine a speed of the chip.

12 Claims, 2 Drawing Sheets

(56) References Cited

U.S. PATENT DOCUMENTS

2006/0085708 A1\* 4/2006 Howard ......... G01R 31/318544
  714/726
2007/0214377 A1\* 9/2007 Jarrar ........................ G06F 1/10
  713/401
2010/0185908 A1\* 7/2010 Guo ............... G01R 31/318594
  714/E11.155

\* cited by examiner

SPEED DETECTION CIRCUIT AND ASSOCIATED CHIP

BACKGROUND OF THE INVENTION

1. Field of the Invention

The present invention relates to a speed detection circuit positioned within a chip.

2. Description of the Prior Art

The current chip is usually designed with one or more ring oscillators to detect a speed of the chip, wherein the ring oscillators are usually implemented by using combinational cells of inverter gate, NAND gate or NOR gate. However, a critical path in the chip is composed of various types of combinational logic circuits and flip-flops. Therefore, due to a difference between the chip speed determined by the ring oscillator and the actual speed on the critical path, it is possible that the chip speed determined by the ring oscillator is normal, but a signal delay of the critical path is too large due to lacks of timing information of the flip-flop and the difference between simple gates inside the ring oscillator and complicated combinational gates inside the critical path.

SUMMARY OF THE INVENTION

It is therefore an objective of the present invention to provide a speed detection circuit positioned within the chip, wherein a detected chip speed can accurately represent characteristics of the critical path, so as to solve the problems described in the prior art.

According to one embodiment of the present invention, a speed detection circuit positioned in a chip is disclosed, wherein the speed detection circuit comprises a test signal generator, a launch flip-flop, a device under test (DUT), a capture flip-flop, a comparator and a control circuit. The test signal generator is configured to generate a test signal with a specific pattern. The launch flip-flop is configured to use a first clock signal to sample the test signal to generate a sampled test signal. The device under test is configured to receive the sampled test signal to generate a delayed test signal. The capture flip-flop is configured to use a second clock signal to sample the delayed test signal to generate an output signal. The comparator is configured to determine whether the output signal conforms to the specific pattern to generate a comparison result. The control circuit is configured to determine a speed of the chip according to the comparison result.

According to one embodiment of the present invention, a chip comprising a core circuit and a plurality of speed detection circuits is disclosed, wherein each of the plurality of speed detection circuits comprises a test signal generator, a launch flip-flop, a DUT, a capture flip-flop, a comparator and a control circuit. The test signal generator is configured to generate a test signal with a specific pattern. The launch flip-flop is configured to use a first clock signal to sample the test signal to generate a sampled test signal. The DUT is configured to receive the sampled test signal to generate a delayed test signal. The capture flip-flop is configured to use a second clock signal to sample the delayed test signal to generate an output signal. The comparator is configured to determine whether the output signal conforms to the specific pattern to generate a comparison result. The control circuit is configured to determine a speed of the chip according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
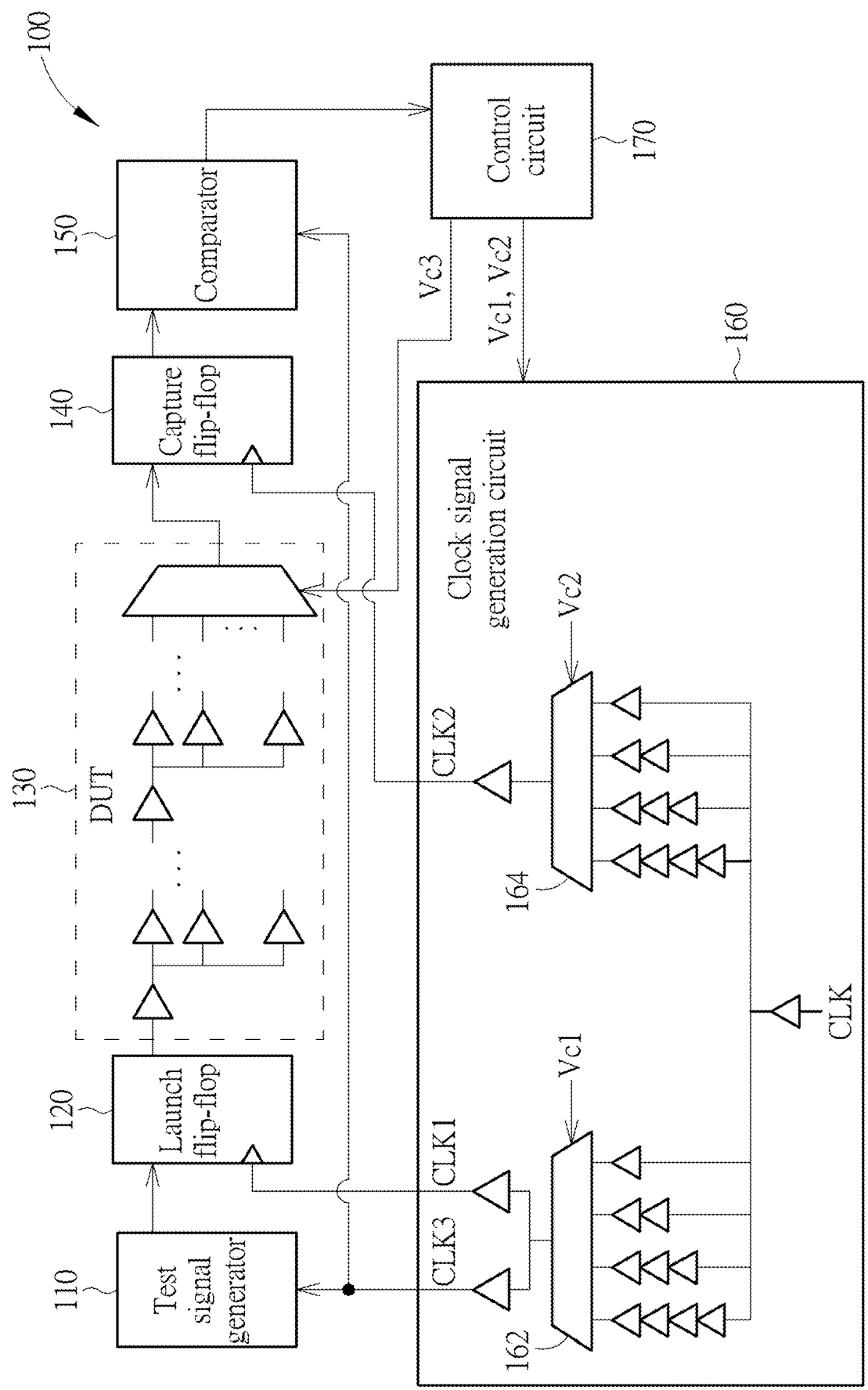
FIG. 1 is a diagram illustrating a speed detection circuit according to one embodiment of the present invention.

FIG. 1 is a diagram of a speed detection circuit 100 according to one embodiment of the present invention. As shown in FIG. 1, the speed detection circuit 100 comprises a test signal generator 110, a launch flip-flop 120, a device under test (DUT) 130, a capture flip-flop 140, a comparator 150, a clock signal generation circuit 160 and a control circuit 170. In this embodiment, the speed detection circuit 100 is a digital circuit, and a detected speed can represent a speed of the chip on which it is located.

In this embodiment, the DUT 130 may comprise any circuit structure, such as a plurality of delay chains with different stages (e.g., 16-stage or 32-stage delay chain), or a real critical path of a digital device under test including a plurality of combinational logic circuits. In addition, a DUT path of the DUT 130 is controlled by a control signal Vc3 generated by the control circuit 170, for example, the control signal Vc3 can control a multiplexer to select one of the DUT paths within the DUT 130. The clock signal generation circuit 160 comprises multiplexers 162, 164 and a plurality of delay circuits for generating clock signals CLK1, CLK2, CLK3 according to a system clock signal CLK, wherein the multiplexer 162 is controlled by a control signal Vc1 generated by the circuit 170 to select one of a plurality of clock signals with different phases, and the selected clock signal passes through different paths to generate the clock signals CLK1 and CLK3, respectively; and the multiplexer 164 is controlled by a control signal Vc2 generated by the circuit 170 to select one of a plurality of clock signals with different phases to generate the clock signal CLK2. It is noted that each delay circuit of the DUT 130 and the clock signal generation circuit 160 is implemented by a buffer, and is represented by a triangular pattern in the figure. The internal structures of the DUT 130 and the clock signal generation circuit 160 shown in FIG. 1 are only for illustrative purposes, and not a limitation of the present invention. As long as the DUT 130 includes a multi-stage digital circuit, and the clock signal generation circuit 160 can generate phase-adjustable clock signals CLK1, CLK2, CLK3, which can have different internal circuit designs.

In the operation of the speed detection circuit 100, the test signal generator 110 receives the clock signal CLK3 and generates a test signal, wherein the test signal has a specific pattern, such as 10101010 . . . , 11001100, . . . or any other suitable digital signal. Then, the launch flip-flop 120 outputs the received test signal according to the clock signal CLK1, for example, the launch flip-flop 120 uses the clock signal CLK1 to sample the received test signal to generate a sampled test signal. Then, the sampled test signal passes through the DUT 130 to generate a delayed test signal, and the capture flip-flop 140 uses the clock signal CLK2 to output the received delayed test signal, for example, the capture flip-flop 140 uses the clock signal CLK2 to sample the received delayed test signal to generate an output signal. Then, the comparator 150 compares the output signal with the specific pattern of the test signal to determine whether the output signal conforms to the specific pattern, so as to generate a comparison result to indicate whether the DUT 130 passes the speed detection test. For example, the comparator 150 can temporarily store the specific pattern through the setting of a state machine, and when the content of the output signal conforms to the specific pattern, the comparator 150 generates the comparison result indicating that the DUT 130 passes the speed detection test, otherwise the comparator 150 generates the comparison result to indicate that the DUT 130 does not pass the speed detection test.

When the comparison result indicates that the device under test 130 has not passed the speed detection, the control circuit 170 can generate control signals Vc1, Vc2 and Vc3 to adjust the phase difference between the clock signals CLK1 and CLK2, such as increasing or decreasing the phase difference between the clock signals CLK1 and CLK2, or shorten the DUT path, until the DUT 130 passes the speed detection test. By using the phase difference between the clock signals CLK1 and CLK2 and/or the shortened DUT path when the DUT 130 passes the speed detection test, the control circuit 170 can know the speed of the DUT 130, and this speed also includes a setup time and a hold time of the launch flip-flop 120 and capture flip-flop 140. Therefore, the speed detection circuit 100 of this embodiment can accurately detect the speed of the chip.

Figure 2:
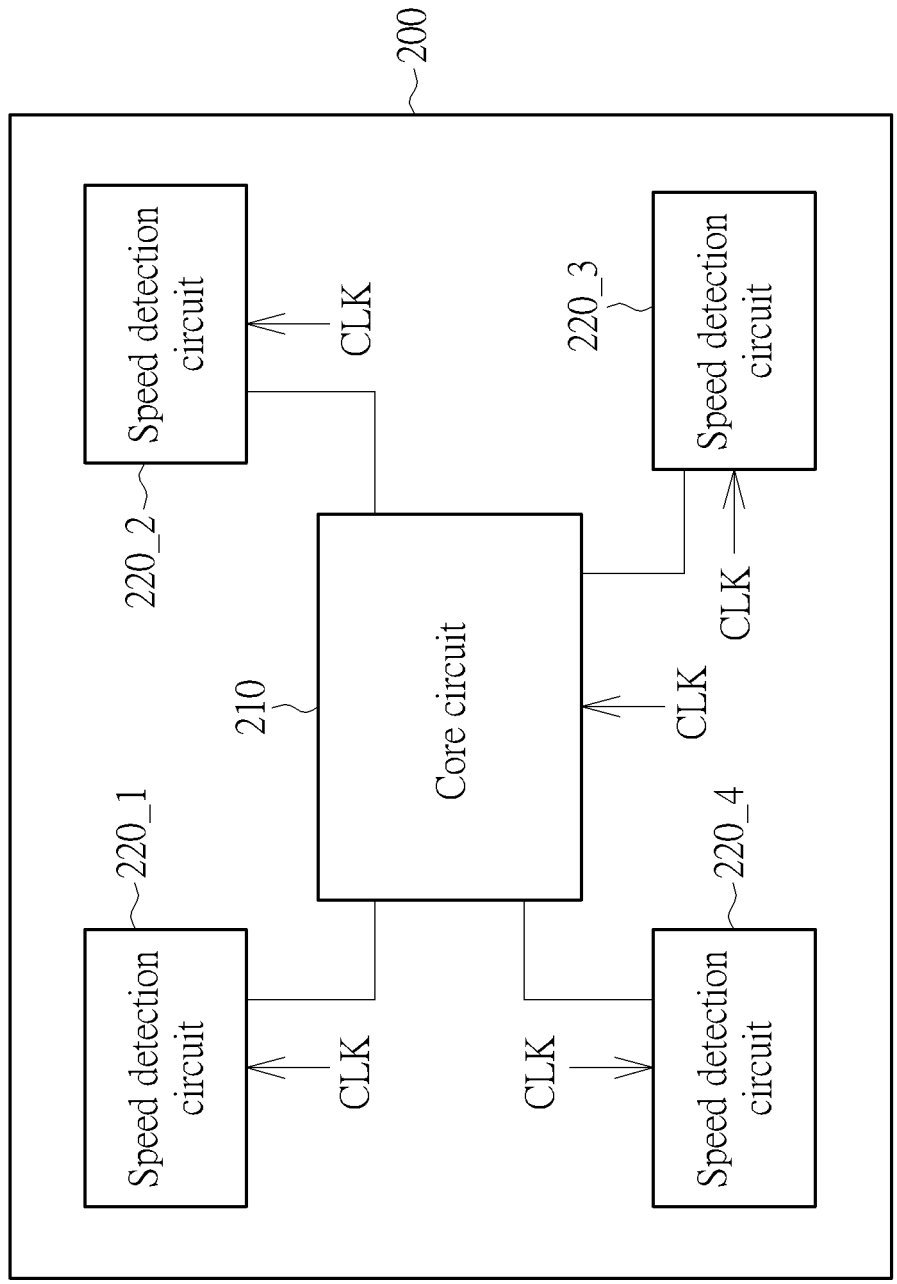
FIG. 2 is a diagram illustrating a chip according to one embodiment of the present invention.

FIG. 2 is a diagram illustrating a chip 200 according to one embodiment of the present invention. As shown in FIG. 2, the chip 200 comprises a core circuit 210 and a plurality of speed detection circuits (in this example, there are four speed detection circuits 220_1-220_4), wherein each of the speed detection circuits 220_1-220_4 can be implemented by using the speed detection circuit 100 shown in FIG. 1. Except that the DUT 130 and the clock signal generation circuit 160 of the speed detection circuits 220_1-220_4 may have different structures, the test signal generator 110, the launch flip-flop 120, the capture flip-flop 140, and the comparator 150 and the control circuit 170 all have the same or similar structures and functions.

In FIG. 2, since the chip 200 comprises a plurality of speed detection circuits 220_1-220_4, and the speed detection circuits 220_1-220_4 can be arranged at different positions of the chip 200, the speed detection results generated by the speed detection circuits 220_1-220_4 can reflect the speeds of different positions in the chip 200, so that the core circuit 210 can perform subsequent operations according to these different speed detection results. For example, the core circuit 210 can select a slowest speed detection result among these speed detection results as the speed of the chip 200.

In one embodiment, the clock signal generation circuit 160 of each of the speed detection circuits 220_1-220_4 receives the system clock signal CLK used by the core circuit 210 to generate the clock signals CLK1, CLK2 and CLK3 shown in FIG. 1, therefore, the speed detection circuits 220_1-220_4 can be combined with an application system executed by the core circuit 210 to more accurately detect the speed of the chip 200.

In one embodiment, the DUT 130 in the plurality of speed detection circuits 220_1-220_4 may have different structures, for example, the DUT 130 in the speed detection circuit 220_1 has a 32-stage delay chain (i.e., 32 delay circuits connected in series), and the DUT 130 in the speed detection circuit 220_2 has a 16-stage delay chain (i.e., 16 delay circuits connected in series), and the core circuit 210 can perform analysis according to the speed detection results corresponding to different delay chains.

Briefly summarized, in the speed detection circuit of the present invention, by using two clock signals CLK1 and CLK2 with different phases to trigger the launch flip-flop 120 and the capture flip-flop 140, and using the comparator 130 to determine whether the output signal conforms to a specific pattern to determine whether the speed detection test is passed, the speed detection result generated by the speed detection circuit can accurately reflect the speed of the chip, and can also reflect characteristics of the setup time and hold time of launch flip-flop 120 and capture flip-flop 140. In addition, by arranging a plurality of speed detection circuits 220_1-220_4 in the chip 200, the speed of different positions in the chip can be obtained for subsequent analysis.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A speed detection circuit positioned in a chip, comprising:
   a test signal generator, configured to generate a test signal with a specific pattern;
   a launch flip-flop, configured to use a first clock signal to sample the test signal to generate a sampled test signal;
   a device under test (DUT), configured to receive the sampled test signal to generate a delayed test signal;
   a capture flip-flop, configured to use a second clock signal to sample the delayed test signal to generate an output signal;
   a comparator, configured to determine whether the output signal conforms to the specific pattern to generate a comparison result; and
   a control circuit, configured to determine a propagation time of the chip according to the comparison result when the comparison result indicating that the output signal conforms to the specific pattern.

2. The speed detection circuit of claim 1, further comprising:
   a clock signal generation circuit, configured to generate the first clock signal and the second clock signal, wherein phases of the first clock signal and the second clock signal are determined according to a control signal generated by the control circuit.

3. The speed detection circuit of claim 2, wherein the clock signal generation circuit generates the first clock signal and the second clock signal according to a system clock signal of the chip.

4. The speed detection circuit of claim 2, wherein when the comparison result indicates that the output signal conforms to the specific pattern, the control circuit determines the propagation time of the chip according to the phases of the first clock signal and the second clock signal.

5. The speed detection circuit of claim 2, wherein when the comparison result indicates that the output signal does not conform to the specific pattern, the control circuit generates the control signal to adjust a phase difference between the first clock signal and the second clock signal or shorten a DUT path of the DUT, until the comparison result generated by the comparator indicates that the output signal conforms to the specific pattern; and when the comparison result indicates that the output signal conforms to the specific pattern, the control circuit determines the propagation time of the chip according to the phases of the first clock signal and the second clock signal.

6. A chip, comprising:
a core circuit; and
a plurality of speed detection circuits, wherein each of the plurality of speed detection circuits comprises:
a test signal generator, configured to generate a test signal with a specific pattern;
a launch flip-flop, configured to use a first clock signal to sample the test signal to generate a sampled test signal;
a device under test (DUT), configured to receive the sampled test signal to generate a delayed test signal;
a capture flip-flop, configured to use a second clock signal to sample the delayed test signal to generate an output signal;
a comparator, configured to determine whether the output signal conforms to the specific pattern to generate a comparison result; and
a control circuit, configured to determine a propagation time of the chip according to the comparison result when the comparison result indicating that the output signal conforms to the specific pattern.

7. The chip of claim 6, wherein each of the plurality of speed detection circuits further comprises:
a clock signal generation circuit, configured to generate the first clock signal and the second clock signal, wherein phases of the first clock signal and the second clock signal are determined according to a control signal generated by the control circuit.

8. The chip of claim 7, wherein the clock signal generation circuit generates the first clock signal and the second clock signal according to a system clock signal of the chip.

9. The chip of claim 7, wherein when the comparison result indicates that the output signal conforms to the specific pattern, the control circuit determines the propagation time of the chip according to the phases of the first clock signal and the second clock signal.

10. The chip of claim 7, wherein when the comparison result indicates that the output signal does not conform to the specific pattern, the control circuit generates the control signal to adjust a phase difference between the first clock signal and the second clock signal or shorten a DUT path of the DUT, until the comparison result generated by the comparator indicates that the output signal conforms to the specific pattern; and when the comparison result indicates that the output signal conforms to the specific pattern, the control circuit determines the propagation time of the chip according to the phases of the first clock signal and the second clock signal.

11. The chip of claim 6, wherein the plurality of speed detection circuits comprise a first speed detection circuit and a second speed detection circuit, and the device under test of the first speed detection circuit is different from the device under test of the second speed detection circuit.

12. The chip of claim 6, wherein the device under test of the first speed detection circuit comprises a first delay chain, the device under test of the second speed detection circuit comprises a second delay chain, and a number of delay circuits connected in series within the first delay chain is different from a number of delay circuits connected in series with the second delay chain.

* * * * *